S. HENRY.
Wheel-Cultivator.

No. 46,355.

Patented Feb. 14, 1865.

Witnesses:
C. L. Topliff
Henry Morris

Inventor:
S. Henry
By Munn & Co.
Att'y

UNITED STATES PATENT OFFICE.

SAML. HENRY, OF CHENOA, ILLINOIS.

IMPROVEMENT IN CULTIVATORS.

Specification forming part of Letters Patent No. 46,355, dated February 14, 1865.

*To all whom it may concern:*

Be it known that I, SAMUEL HENRY, of Chenoa, McLean county, and State of Illinois, have invented a new and Improved Cultivator; and I do hereby declare that the following is a full, clear, and exact description thereof, which will enable those skilled in the art to make and use the same, reference being had to the accompanying drawings, making a part of this specification, in which—

Figure 1:
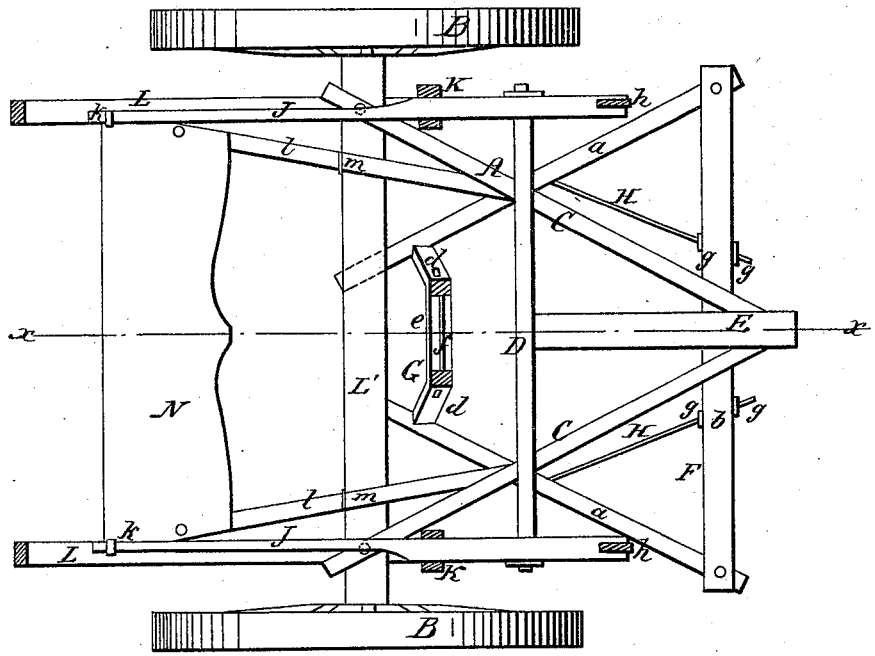
Figure 2:
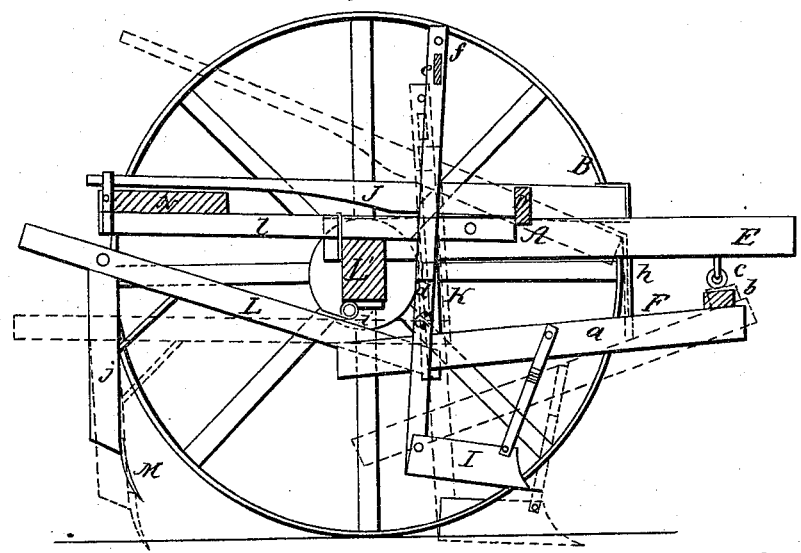

Figure 1 is a plan or top view of my invention. Fig. 2 is a side sectional view of my invention, taken in the line $x$ $x$, Fig. 1.

Similar letters of reference indicate corresponding parts in the two figures.

This invention relates to a new and improved cultivator of that class which are provided with adjustable plows which work laterally for the purpose of admitting of the plows being moved in the direction specified in order to conform to the sinuosities of the rows.

The invention consists in the employment or use of an adjustable plow-frame arranged and combined with adjustable plow-beams in such a manner that all of the plows will be under the complete control of the operator and all be capable of being raised and lowered simultaneously.

A represents a frame, which is mounted on two wheels, B B, said frame being composed of two hounds, C C, and a cross-bar, D, to which a draft-pole, E, is attached.

F is a frame, the sides $a$ $a$ of which have an oblique position, gradually approaching each other from their front to their back ends, as shown in Fig. 1. The front cross-piece, $b$, of this frame is attached to the under side of the draft-pole E by a universal joint, $c$, and to the back part of said frame there is secured an upright frame, G, the latter being composed of two bars, $d$ $d$, slightly inclined inward or toward each other and connected by a cross-bar, $e$, and a rod, $f$.

H H are two brace-rods, the back ends of which are connected to the oblique bars or sides $a$ $a$ of the frame F, the front ends of said brace-rods H H passing through the cross-piece $b$, and provided each with two screw-nuts, $g$ $g$, one at each side of $b$, as shown in Fig. 1. By turning these nuts $g$ $g$ the oblique bars or sides $a$ $a$ may be spread more or less apart at their rear ends, so as to regulate the distance between the plows I, which are attached to the lower end of the frame G and the bars or sides $a$ $a$ of the frame F, as shown in Fig. 2.

J J are two levers which are fitted on the ends of the cross-bar D and allowed to work freely thereon. The front ends of the levers J are connected by straps $h$ to the frame F. These levers J have each a pendant, K, attached to them, and these pendants extend down and are connected to the front ends of plow-beams L L, which are attached by joints $i$ to the under side of the axle L, as shown in Fig. 2. These plow-beams have standards $j$ attached to them near their back ends, each standard having a plow, M, secured to it.

From the above description it will be seen that by elevating the back ends of the levers J J the frame F and the back parts of the plow-beams L L will descend, and the plows of said beams, as well as those attached to frames F G, allowed to penetrate into the earth; and it will further be seen that the driver from his seat N may, by means of his feet, move the frames F G laterally, so that the plows I may be made to conform to the sinuosities of the rows of plants, there being a plow, I, at each side of the row, the plows M of the beams L operating in the centers of the spaces between the rows. By drawing down the back ends of the levers J J the plows I M will all be raised simultaneously, and they may be retained in an elevated position by means of hooks $k$ $k$, attached one to each end of the seat N. The seat N is attached to bars $l$ $l$, which pass through straps $m$, secured to the axle L', and are attached at their front ends to the hounds C C.

What I claim as new, and desire to secure by Letters Patent, is—

The arrangement of the levers J J, connected by straps $h$ to the pivoted frame F G, and by pendants K K to the plow-beams L L, which are hinged to the axle, the said frame F G being further capable of lateral deflection by pressure of the feet of the driver, substantially as and for the purposes described.

SAMUEL HENRY.

Witnesses:
LOUIS ZIEGLER,
R. C. ROLLINS.